United States Patent
Ding et al.

(10) Patent No.: US 11,702,524 B2
(45) Date of Patent: Jul. 18, 2023

(54) ULTRA-LIGHT GRAPHENE-RUBBER FOAM PARTICLE FOR SOLES AND METHOD FOR PREPARING SAME

(71) Applicant: Fujian Wuchiheng Technology Stock Co., LTD., Fujian (CN)

(72) Inventors: Tianning Ding, Fujian (CN); Decai Ding, Fujian (CN); Yousi Ding, Fujian (CN)

(*) Notice: Subject to any disclaimer, the term of this patent is extended or adjusted under 35 U.S.C. 154(b) by 681 days.

(21) Appl. No.: 16/617,501

(22) PCT Filed: Jun. 13, 2019

(86) PCT No.: PCT/CN2019/091164
§ 371 (c)(1),
(2) Date: Nov. 27, 2019

(87) PCT Pub. No.: WO2020/143162
PCT Pub. Date: Jul. 16, 2020

(65) Prior Publication Data
US 2021/0332208 A1 Oct. 28, 2021

(30) Foreign Application Priority Data
Jan. 8, 2019 (CN) .......................... 201910017847.3

(51) Int. Cl.
| | |
|---|---|
| C08J 9/00 | (2006.01) |
| C08K 3/04 | (2006.01) |
| A43B 13/04 | (2006.01) |
| C08F 136/06 | (2006.01) |
| C08F 136/08 | (2006.01) |
| C08J 9/10 | (2006.01) |
| C08K 3/06 | (2006.01) |
| C08K 3/08 | (2006.01) |
| C08K 3/22 | (2006.01) |
| C08K 3/34 | (2006.01) |
| C08K 5/01 | (2006.01) |
| C08K 5/098 | (2006.01) |
| C08L 7/00 | (2006.01) |
| C08L 9/06 | (2006.01) |
| C08L 83/04 | (2006.01) |

(52) U.S. Cl.
CPC ............ *C08J 9/0061* (2013.01); *A43B 13/04* (2013.01); *C08F 136/06* (2013.01); *C08F 136/08* (2013.01); *C08J 9/008* (2013.01); *C08J 9/009* (2013.01); *C08J 9/0095* (2013.01); *C08J 9/103* (2013.01); *C08K 3/042* (2017.05); *C08K 3/06* (2013.01); *C08K 3/08* (2013.01); *C08K 3/22* (2013.01); *C08K 3/346* (2013.01); *C08K 5/01* (2013.01); *C08K 5/098* (2013.01); *C08L 7/00* (2013.01); *C08L 9/06* (2013.01); *C08L 83/04* (2013.01); *C08J 2201/022* (2013.01); *C08J 2201/026* (2013.01); *C08J 2203/04* (2013.01); *C08J 2307/00* (2013.01); *C08J 2409/06* (2013.01); *C08J 2439/02* (2013.01); *C08K 2003/0818* (2013.01); *C08K 2003/2296* (2013.01); *C08K 2201/011* (2013.01); *C08L 2205/035* (2013.01)

(58) Field of Classification Search
CPC . C08J 9/0061; C08J 9/008; C08J 9/009; C08J 9/0095; C08J 9/103; C08J 2201/022; C08J 2201/026; C08J 2203/04; C08J 2307/00; C08J 2409/00; C08J 2439/02; C08J 2409/06; C08K 3/042; C08K 3/06; C08K 3/08; C08K 3/22; C08K 3/346; C08K 5/01; C08K 5/098; C08K 2409/06; C08K 2003/2296; C08K 2003/0818; C08K 2201/011; C08K 9/103; A43B 13/04; C08F 136/06; C08F 136/08; C08L 7/00; C08L 9/06; C08L 83/04; C08L 2205/035
USPC ..................................................... 36/61, 32
See application file for complete search history.

(56) References Cited

FOREIGN PATENT DOCUMENTS

| | | | | |
|---|---|---|---|---|
| CN | 105602015 A | * | 5/2016 | |
| CN | 108997647 A | * | 12/2018 | ............. A43B 13/04 |
| CN | 109438821 A | * | 3/2019 | ............. A43B 13/04 |

OTHER PUBLICATIONS

CN 105602015 A, machine translation, EPO espacenet. (Year: 2016).*
CN 108997647 A, machine translation, EPO espacenet. (Year: 2018).*
CN 109438821 A, machine translation, EPO espacenet. (Year: 2019).*

* cited by examiner

Primary Examiner — Ling Siu Choi
Assistant Examiner — Ronald Grinsted

(57) ABSTRACT

An ultra-light graphene-rubber foam particle for soles is prepared from, by weight, 60-65 parts of natural rubber, 8-12 parts of isoprene rubber, 8-12 parts of butadiene rubber, 6-8 parts of styrene butadiene rubber, 0.8-1.0 parts of modified graphene, 0.08-0.12 parts of poly(N-vinylacetamide), 0.8-1.0 parts of silicone oil, 3.0-3.5 parts of inorganic nanoparticles, 1.2-1.5 parts of activated zinc oxide, 0.8-1.0 parts of zinc stearate, 1.0-1.2 parts of stearic acid, 0.8-1.0 parts of cross-linking agents, 2.0-3.0 parts of flow promotors, and 1.5-1.8 parts of foaming agents. According to the invention, the modified graphene is uniformly dispersed into the rubber materials, so that the ultra-light graphene-rubber foam particle has good thermal stability, wear resistance and tensile strength, the permanent compressive-deformation performance and thermal contraction resistance are improved, and the weight is reduced by over 50%.

6 Claims, No Drawings

ULTRA-LIGHT GRAPHENE-RUBBER FOAM PARTICLE FOR SOLES AND METHOD FOR PREPARING SAME

BACKGROUND OF THE INVENTION

1. Technical Field

The invention relates to the technical field of rubber products, in particular to an ultra-light graphene-rubber foam particle for soles and a method for preparing the same.

2. Description of Related Art

Of all rubber materials, natural rubber is the one which has the physical and mechanical properties best coordinating with the processability and has been widely applied in the fields of daily life, medical services, transportation, agriculture, scientific experiments, national defense, and so on. With the development of society, people are putting forward higher and higher requirements for the properties of products, especially for the properties of rubber foamed soles. Traditional rubber foamed soles are heavy and poor in thermal contraction resistance and fail to meet the wear-resistance requirements, thereby needing to be improved.

In recent years, graphene is used for modifying rubber materials in many studies. However, it is discovered, in the application of the graphene, that the laminated structure of the graphene can generate a large Van der Waals force or can easily interact with hydrogen bonds, and consequentially, the graphene is prone to agglomeration and cannot be uniformly and stably dispersed. Generally, some organic functional groups such as carboxyl, oxhydryl, and amidogen are grafted onto the surface of the graphene through chemical grafting to improve the dispersity of the graphene in high-molecular polymers. However, this method destroys the crystal structure of the graphene and greatly affects the intrinsic properties of the graphene.

BRIEF SUMMARY OF THE INVENTION

The objective of the invention is to provide an ultra-light graphene-rubber foam particle for soles and a method for preparing the same to reduce the weight and to improve the wear resistance and thermal contraction resistance.

The technical solution adopted by the invention is as follows:

An ultra-light graphene-rubber foam particle for soles is prepared from, by weight, 60-65 parts of natural rubber, 8-12 parts of isoprene rubber, 8-12 parts of butadiene rubber, 6-8 parts of styrene butadiene rubber, 0.8-1.0 parts of modified graphene, 0.08-0.12 parts of poly(N-vinylacetamide), 0.8-1.0 parts of silicone oil, 3.0-3.5 parts of inorganic nano-particles, 1.2-1.5 parts of activated zinc oxide, 0.8-1.0 parts of zinc stearate, 1.0-1.2 parts of stearic acid, 0.8-1.0 parts of cross-linking agents, 2.0-3.0 parts of flow promotors, and 1.5-1.8 parts of foaming agents.

Preferably, the inorganic nano-particles are at least one selected from nano-calcium, kaolin, and nano-montmorillonite.

Preferably, the cross-linking agents are insoluble sulfur.

Preferably, the flow promotors are paraffin.

Preferably, the foaming agents are azodicarbonamide.

Preferably, the modified graphene is laminated functional graphene.

The invention further provides a method for preparing the ultra-light graphene-rubber foam particle for soles. The method specifically comprises the following steps:

1. Homogenization of the natural rubber: 60-65 parts of natural rubber are placed into an internal mixer to be homogenized for 15-20 minutes at a temperature of 150° C.-155° C., and the homogenized natural rubber is to be used 72 hours later;

2. Mixing: the homogenized natural rubber, 8-12 parts of isoprene rubber, 8-12 parts of butadiene rubber, 6-8 parts of styrene butadiene rubber, 0.8-1.0 parts of modified graphene, 0.08-0.12 parts of poly(N-vinylacetamide), 0.8-1.0 parts of silicone oil, and 3.0-3.5 parts of inorganic nano-particles are placed into the internal mixer to be mixed for 15-20 minutes at a temperature of 120° C.-150° C. to obtain a rubber mixture which is to be used 24 hours later;

3 Internal mixing: the rubber mixture standing for more than 24 hours is placed into the internal mixer, then 1.2-1.5 parts of activated zinc oxide, 0.8-1.0 parts of zinc stearate, 1.0-1.2 parts of stearic acid, 0.8-1.0 parts of cross-linking agents, 2.0-3.0 parts of flow promotors, and 1.5-1.8 parts of foaming agents are added into the internal mixer to be internally mixed with the rubber mixture, the heating rate is controlled in the internal mixing process, internal mixing is stopped when the temperature reaches 110° C.-112° C., and a rubber compound is poured out;

4. Milling: the rubber compound poured out of the internal mixer is milled twice in an open mill to obtain a sheet; and 5. Granulation: a milled compound is granulated in a granulator.

Preferably, in Step 3, the heating rate is controlled as follows: the temperature is rapidly increased to 95° C.-100° C. and is then maintained for low-speed internal mixing for 7-8 minutes, then the temperature is gradually increased to 110° C.-112° C. at a rate of 1.0° C./min-1.2° C./min, and then the rubber compound is discharged.

The invention has the following beneficial effects: the natural rubber is used as the main rubber material and is modified by the isoprene rubber, the butadiene rubber, the styrene butadiene rubber, and the modified graphene, and amphiphilic helical nonionic dispersing agents, the inorganic nano-particles and the silicone oil are added, so that the modified graphene is uniformly dispersed into the rubber materials, the ultra-light graphene-rubber foam particle has good thermal stability, wear resistance and tensile strength, the permanent compressive-deformation performance and thermal contraction resistance are improved, and the weight is reduced by over 50%. Besides, the insoluble sulfur is adopted, so that the vulcanization uniformity is guaranteed, the vulcanization time is greatly shortened, and the aging resistance of the foam particle is improved. The laminated functional graphene is regular in shape and compact in structure and is stably and uniformly distributed in base rubber in a laminated manner, the graphene has a unique two-dimensional laminated structure, a very high diameter-thickness ratio and a flexible form, contains active groups such as Si—O—C, C=C, and C=O, and covers the surfaces of foam micro-pores while good interface bonding with the base rubber is achieved in the vulcanization process, so that the thermal contraction resistance and strength of the foam micro-pores are improved; and the graphene can slide under an external force to dissipate energy, and therefore, destructive impacts on the foam micro-pores are dispersed.

DETAILED DESCRIPTION OF THE INVENTION

Embodiment 1

The ultra-light graphene-rubber foam particle for soles in this embodiment is prepared from, by weight, 60 parts of natural rubber, 10 parts of isoprene rubber, 9 parts of butadiene rubber, 8 parts of styrene butadiene rubber, 0.85 parts of laminated functional graphene, 0.08 parts of poly(N-vinylacetamide), 1.0 part of silicone oil, 3.0 parts of nano-calcium, 1.5 parts of activated zinc oxide, 1.0 part of zinc stearate, 1.2 parts of stearic acid, 0.8 parts of insoluble sulfur, 2.0 parts of paraffin, and 1.5 parts of azodicarbonamide.

Embodiment 2

The ultra-light graphene-rubber foam particle for soles in this embodiment is prepared from, by weight, 65 parts of natural rubber, 8 parts of isoprene rubber, 10 parts of butadiene rubber, 6 parts of styrene butadiene rubber, 1.0 part of laminated functional graphene, 0.12 parts of poly(N-vinylacetamide), 1.0 part of silicone oil, 3.2 parts of nano-calcium, 1.5 parts of activated zinc oxide, 0.8 parts of zinc stearate, 1.2 parts of stearic acid, 1.0 part of insoluble sulfur, 3.0 parts of paraffin, and 1.6 parts of azodicarbonamide.

Embodiment 3

The ultra-light graphene-rubber foam particle for soles in this embodiment is prepared from, by weight, 62 parts of natural rubber, 12 parts of isoprene rubber, 8 parts of butadiene rubber, 8 parts of styrene butadiene rubber, 1.0 part of laminated functional graphene, 0.1 part of poly(N-vinylacetamide), 0.8 parts of silicone oil, 3.5 parts of nano-calcium, 1.2 parts of activated zinc oxide, 1.0 part of zinc stearate, 1.0 part of stearic acid, 1.0 part of insoluble sulfur, 2.5 parts of paraffin, and 1.8 parts of azodicarbonamide.

Embodiment 4

The ultra-light graphene-rubber foam particle for soles in this embodiment is prepared from, by weight, 60 parts of natural rubber, 12 parts of isoprene rubber, 8 parts of butadiene rubber, 6 parts of styrene butadiene rubber, 0.8 parts of laminated functional graphene, 0.1 part of poly(N-vinylacetamide), 0.8 parts of silicone oil, 3.0 parts of kaolin, 1.5 parts of activated zinc oxide, 0.8 parts of zinc stearate, 1.2 parts of stearic acid, 1.0 part of insoluble sulfur, 2.5 parts of paraffin, and 1.5 parts of azodicarbonamide.

Embodiment 5

The ultra-light graphene-rubber foam particle for soles in this embodiment is prepared from, by weight, 62 parts of natural rubber, 8 parts of isoprene rubber, 10 parts of butadiene rubber, 7 parts of styrene butadiene rubber, 1.0 part of laminated functional graphene, 0.12 parts of poly(N-vinylacetamide), 1.0 part of silicone oil, 3.5 parts of nano-montmorillonite, 1.2 parts of activated zinc oxide, 1.0 part of zinc stearate, 1.0 part of stearic acid, 0.8 parts of insoluble sulfur, 3.0 parts of paraffin, and 1.5 parts of azodicarbonamide.

A method for preparing the ultra-light graphene-rubber foam particle for soles in Embodiments 1-5 comprises the following steps:

1. Homogenization of the natural rubber: the corresponding parts of natural rubber are placed into an internal mixer to be homogenized for 15-20 minutes at a temperature of 150° C.-155° C., and the homogenized natural rubber is to be used 72 hours later;

2. Mixing: the homogenized natural rubber and the corresponding parts of isoprene rubber, butadiene rubber, styrene butadiene rubber, modified graphene, poly(N-vinylacetamide), silicone oil and inorganic nano-particles are placed into the internal mixer to be mixed for 15-20 minutes at a temperature of 120° C.-125° C. to obtain a rubber mixture which is to be used 24 hours later;

3. Internal mixing: the rubber mixture standing for more than 24 hours is placed in the internal mixer, then the corresponding parts of activated zinc oxide, zinc stearate, stearic acid, cross-linking agents, flow promotors and foaming agents are added into the internal mixer to be internally mixed synchronously, and the heating rate is controlled as follows: the temperature is rapidly increased to 95° C.-100° C. and is then maintained for low-speed internal mixing for 7-8 minutes, then the temperature is gradually increased to 110° C.-112° C. at a rate of 1.0° C./min-1.2° C./min, and then a rubber compound is discharged;

4. Milling: the rubber compound poured out of the internal mixer is milled twice in an open mill to obtain a sheet; and 5. Granulation: a milled compound is granulated in a granulator.

Wherein, a method for preparing the laminated functional graphene SF-GNRs comprises the following steps: an appropriate amount of GONRs is added to absolute ethyl alcohol in a proportion of 1:500 and ultrasonically processed for 1 hour to form a uniform dispersion liquid, and then a certain amount of HCl is added to regulate the pH of the system to 3-4; an appropriate amount of KH-570 is weighed, is then dispersed into absolute ethyl alcohol in a proportion of 3:100, and is ultrasonically processed for 30 minutes to obtain a solution which is in turn added to the dispersion liquid to be uniformly stirred, and then a mixture system is heated to 60° C. to carry out a reaction for 24 hours; afterwards, the mixture system is repeatedly filtered and washed with absolute ethyl alcohol and deionized water by means of a polytetrafluoroethylene filter membrane to eliminate unreacted KH-570 in the system and to be regulated to be neutral, and is then dried in a cold dryer to obtain the laminated functional graphene F-GONRs; the F-GONRs prepared is dispersed into deionized water and is ultrasonically processed for 1.5 hours to form a uniform dispersion liquid, and then a certain amount of ammonium hydroxide is added to regulate the pH of the system to 9-10 and is uniformly stirred at a certain speed; afterwards, hydrazine hydrate is added and is uniformly stirred for 1 hour, and then the reaction system is transferred into an oil bath pan at a temperature of 90° C. to react for 12 hours; and after the reaction is over, the system is naturally cooled to the indoor temperature, is then repeatedly filtered and washed with absolute ethyl alcohol and deionized water by means of the polytetrafluoroethylene filter membrane to sufficiently eliminate trace impurities in the system and to be regulated to be neutral, and is then dried in the cold dryer to obtain SF-GNRs.

Contrast Embodiment 1

The ultra-light graphene-rubber foam particle for soles in Contrast Embodiment 1 is prepared from, by weight, 60 parts of natural rubber, 10 parts of isoprene rubber, 9 parts of butadiene rubber, 8 parts of styrene butadiene rubber, 0.85 parts of laminated functional graphene, 0.08 parts of poly (N-vinylacetamide), 1.0 part of silicone oil, 3.0 parts of nano-calcium, 1.5 parts of activated zinc oxide, 1.0 part of zinc stearate, 1.2 parts of stearic acid, 0.8 parts of common sulfur, 2.0 parts of paraffin, and 1.5 parts of azodicarbonamide. The method for preparing the ultra-light graphene-rubber foam particle for soles in this contrast embodiment is implemented with reference to the preparation method in Embodiment 1, but the time for low-speed internal mixing in Step 3 is more than 10 minutes in this contrast embodiment.

Contrast Embodiment 2

A formula of the ultra-light graphene-rubber foam particle in Contrast Embodiment 2 is the same as that of the ultra-light graphene-rubber foam particle in Embodiment 1, and the preparation method in Contrast Embodiment 2 differs from the preparation method in Embodiment 1 in that the rubber mixture prepared in Step 2 is directly used for internal mixing in Step 3 within two hours.

Contrast Embodiment 3

A formula of the ultra-light graphene-rubber foam particle in Contrast Embodiment 3 is the same as that of the ultra-light graphene-rubber foam particle in Embodiment 1, and the preparation method in Contrast Embodiment 3 differs from the preparation method in Embodiment 1 in that the heating rate during internal mixing in Step 3 reaches 1.5° C. and the temperature of the discharged rubber compound in Step 3 reaches 115° C.

Samples are prepared according to Embodiments 1-5 and Contrast Embodiments 1-3, the physical properties of these samples are tested, and test results are shown in Table 1.

TABLE 1

Test results of the physical properties of the samples prepared according to Embodiments 1-5 and Contrast Embodiments 1-3

| Physical property | Tensile strength MPa | Elongation at break % | DIN wear mm3 | Compressive deformation % | Thermal contraction % |
|---|---|---|---|---|---|
| Embodiment 1 | 22.3 | 425 | 46 | 32 | 1.2 |
| Embodiment 2 | 21.2 | 432 | 42 | 33 | 1.4 |
| Embodiment 3 | 22.9 | 421 | 51 | 35 | 1.2 |
| Embodiment 4 | 20.4 | 418 | 48 | 32 | 1.1 |
| Embodiment 5 | 19.8 | 408 | 50 | 34 | 1.3 |
| Contrast Embodiment 1 | 21.1 | 410 | 48 | 34 | 1.4 |
| Contrast Embodiment 2 | 16.8 | 383 | 58 | 40 | 1.8 |
| Contrast Embodiment 3 | 19.2 | 378 | 60 | 40 | 2.0 |
| Preparation method | GB/T528 | GB/T528 | GB/T9867 | HG/T2876 | HG/T2874 |

The basic principles, main characteristics, and advantages of the invention are displayed and described above. Those skilled in this field should understand that the invention is not limited to the above embodiments, and the description of the above embodiments and the specification are only used for explaining the principles of the invention. Various changes and improvements can be made without deviating from the spirit and scope of the invention, and all these changes and improvements should fall within the protection scope of the invention. The protection scope of the invention is defined by the claims appended and their equivalents.

What is claimed is:

1. An ultra-light graphene-rubber foam particle for soles, being prepared from, by weight, 60-65 parts of natural rubber, 8-12 parts of isoprene rubber, 8-12 parts of butadiene rubber, 6-8 parts of styrene butadiene rubber, 0.8-1.0 parts of modified graphene, 0.08-0.12 parts of poly(N-vinylacetamide), 0.8-1.0 parts of silicone oil, 3.0-3.5 parts of inorganic nano-particles, 1.2-1.5 parts of activated zinc oxide, 0.8-1.0 parts of zinc stearate, 1.0-1.2 parts of stearic acid, 0.8-1.0 parts of cross-linking agents, 2.0-3.0 parts of flow promotors, and 1.5-1.8 parts of foaming agents.

2. The ultra-light graphene-rubber foam particle for soles according to claim 1, wherein the inorganic nano-particles are at least one selected from nano-calcium, kaolin, and nano-montmorillonite.

3. The ultra-light graphene-rubber foam particle for soles according to claim 1, wherein the cross-linking agents are insoluble sulfur.

4. The ultra-light graphene-rubber foam particle for soles according to claim 1, wherein the flow promotors are paraffin.

5. The ultra-light graphene-rubber foam particle for soles according to claim 1, wherein the foaming agents are azodicarbonamide.

6. The ultra-light graphene-rubber foam particle for soles according to claim 1, wherein the modified graphene is laminated functional graphene.

\* \* \* \* \*